(12) United States Patent
Barletta et al.

(10) Patent No.: US 10,037,197 B2
(45) Date of Patent: Jul. 31, 2018

(54) FLEXIBLE MICROINSTRUCTION SYSTEM FOR CONSTRUCTING MICROPROGRAMS WHICH EXECUTE TASKS, GATEWAYS, AND EVENTS OF BPMN MODELS

(71) Applicant: Oracle International Corporation, Redwood Shores, CA (US)

(72) Inventors: Patricio Osvaldo Barletta, Buenos Aires (AR); Julian Esevich Sanchez, Pilar (AR); Eduardo Adrian Cominguez, Buenos Aires (AR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/834,595

(22) Filed: Mar. 15, 2013

(65) Prior Publication Data

US 2014/0282366 A1 Sep. 18, 2014

(51) Int. Cl.
*G06F 9/45* (2006.01)
*G06F 8/41* (2018.01)
*G06F 11/36* (2006.01)
*G06Q 10/06* (2012.01)

(52) U.S. Cl.
CPC ............ *G06F 8/41* (2013.01); *G06F 11/3668* (2013.01); *G06Q 10/067* (2013.01); *G06Q 10/0631* (2013.01)

(58) Field of Classification Search
CPC ........................................................ G06F 8/41
USPC ........................................................ 717/140
See application file for complete search history.

(56) References Cited

U.S. PATENT DOCUMENTS

| | | | |
|---|---|---|---|
| 5,721,913 A | 2/1998 | Ackroff et al. | |
| 5,799,297 A | 8/1998 | Goodridge et al. | |
| 5,978,836 A | 11/1999 | Ouchi | |
| 6,003,011 A | 12/1999 | Sarin et al. | |
| 6,026,365 A | 2/2000 | Hayashi | |
| 6,035,123 A * | 3/2000 | Razdan | G06F 8/443 712/E9.035 |
| 6,161,113 A | 12/2000 | Mora et al. | |
| 6,170,002 B1 | 1/2001 | Ouchi | |
| 6,308,224 B1 | 10/2001 | Leymann et al. | |

(Continued)

OTHER PUBLICATIONS

Oracle Fusion Middleware Modeling and Implementation Guide for Oracle Business Process Management 11g Release 1 (11.1.1.5.0) Copyright 2011.

(Continued)

*Primary Examiner* — James D. Rutten
(74) *Attorney, Agent, or Firm* — Tucker Ellis LLP

(57) ABSTRACT

In accordance with embodiments of the invention, a set of Microinstructions define a set of primitives or instructions to execute a business process modeling language in accordance with the semantics defined by the language. The Microinstructions define atomic operations that can be executed as part of a running process. The Microinstructions can be combined into Microprograms which map to business processes of the business process modeling language, for example BPMN. The Microprograms can be compiled using a suitable compiler into any execution language. The Microinstructions thereby provide flexibility for executing business process modeling languages in any business process execution language.

20 Claims, 3 Drawing Sheets

ORACLE CONFIDENTIAL

(56) References Cited

U.S. PATENT DOCUMENTS

| | | | |
|---|---|---|---|
| 6,327,702 B1 * | 12/2001 | Sauntry | G06F 9/45504 717/118 |
| 6,397,182 B1 | 5/2002 | Cruickshank et al. | |
| 6,397,191 B1 | 5/2002 | Notani et al. | |
| 6,470,227 B1 | 12/2002 | Rangachari et al. | |
| 6,496,831 B1 | 12/2002 | Baulier et al. | |
| 6,507,845 B1 | 1/2003 | Cohen et al. | |
| 6,516,507 B2 | 2/2003 | Noel et al. | |
| 6,519,642 B1 | 2/2003 | Olsen et al. | |
| 6,567,783 B1 | 5/2003 | Notani et al. | |
| 6,574,675 B1 | 6/2003 | Swenson | |
| 6,574,736 B1 | 6/2003 | Andrews | |
| 6,584,487 B1 | 6/2003 | Saboff | |
| 6,606,740 B1 | 8/2003 | Lynn et al. | |
| 6,742,015 B1 | 5/2004 | Bowman-Amuah | |
| 6,889,231 B1 | 5/2005 | Souder et al. | |
| 6,895,573 B2 | 5/2005 | Nørgaard et al. | |
| 6,970,844 B1 | 11/2005 | Bierenbaum | |
| 7,020,697 B1 | 3/2006 | Goodman et al. | |
| 7,062,746 B2 | 6/2006 | Roesner et al. | |
| 7,124,192 B2 | 10/2006 | High et al. | |
| 7,174,514 B2 | 2/2007 | Subramaniam et al. | |
| 7,236,939 B2 | 6/2007 | Chen et al. | |
| 7,272,816 B2 | 9/2007 | Schulz et al. | |
| 7,289,966 B2 | 10/2007 | Ouchi | |
| 7,370,335 B1 | 5/2008 | White et al. | |
| 7,403,989 B2 | 7/2008 | Beringer et al. | |
| 7,406,432 B1 | 7/2008 | Motoyama | |
| 7,418,475 B2 | 8/2008 | Stewart et al. | |
| 7,428,495 B2 | 9/2008 | Dhar et al. | |
| 7,448,046 B2 | 11/2008 | Navani et al. | |
| 7,451,477 B2 | 11/2008 | Griffin et al. | |
| 7,464,366 B2 | 12/2008 | Shukla et al. | |
| 7,493,593 B2 | 2/2009 | Koehler | |
| 7,498,866 B2 | 3/2009 | Choi | |
| 7,519,711 B2 | 4/2009 | Mohindra et al. | |
| 7,543,292 B2 | 6/2009 | Haller et al. | |
| 7,603,674 B2 | 10/2009 | Cyr et al. | |
| 7,631,291 B2 | 12/2009 | Shukla et al. | |
| 7,644,432 B2 | 1/2010 | Patrick et al. | |
| 7,676,483 B2 | 3/2010 | Klug | |
| 7,680,683 B2 | 3/2010 | Hilerio et al. | |
| 7,685,604 B2 | 3/2010 | Baartman et al. | |
| 7,689,562 B2 | 3/2010 | Schaad et al. | |
| 7,702,736 B2 | 4/2010 | Ouchi | |
| 7,730,162 B2 | 6/2010 | Lynch et al. | |
| 7,814,142 B2 | 10/2010 | Mamou et al. | |
| 7,885,847 B2 | 2/2011 | Wodtke et al. | |
| 7,925,527 B1 | 4/2011 | Flam | |
| 7,953,696 B2 | 5/2011 | Davis et al. | |
| 8,046,747 B2 | 10/2011 | Cyr et al. | |
| 8,065,315 B2 | 11/2011 | Rapp et al. | |
| 8,069,439 B2 | 11/2011 | Shukla et al. | |
| 8,140,369 B2 | 3/2012 | Paul et al. | |
| 8,140,573 B2 | 3/2012 | McKay et al. | |
| 8,145,944 B2 | 3/2012 | Fong et al. | |
| 8,156,083 B2 | 4/2012 | Banerjee et al. | |
| 8,165,993 B2 | 4/2012 | Broda et al. | |
| 8,170,897 B1 | 5/2012 | Cohen et al. | |
| 8,175,936 B2 | 5/2012 | Ronen et al. | |
| 8,280,822 B2 | 10/2012 | McKeown et al. | |
| 8,381,180 B2 | 2/2013 | Rostoker | |
| 8,424,011 B2 | 4/2013 | Barros et al. | |
| 8,443,351 B2 | 5/2013 | Haselden et al. | |
| 8,464,206 B2 | 6/2013 | Jenkins et al. | |
| 8,560,372 B2 | 10/2013 | Balko et al. | |
| 8,762,974 B1 * | 6/2014 | Smith et al. | 717/152 |
| 2002/0178119 A1 | 11/2002 | Griffin et al. | |
| 2003/0135384 A1 | 7/2003 | Nguyen | |
| 2003/0158832 A1 | 8/2003 | Sijacic et al. | |
| 2004/0093593 A1 * | 5/2004 | Jhanwar et al. | 717/169 |
| 2004/0230466 A1 | 11/2004 | Davis et al. | |
| 2005/0049924 A1 | 3/2005 | DeBettencourt et al. | |
| 2005/0071347 A1 | 3/2005 | Chau et al. | |
| 2006/0069995 A1 | 3/2006 | Thompson et al. | |
| 2006/0074703 A1 | 4/2006 | Bhandarkar et al. | |
| 2006/0074915 A1 | 4/2006 | Bhandarkar et al. | |
| 2006/0218394 A1 | 9/2006 | Yang | |
| 2006/0229925 A1 | 10/2006 | Chalasani et al. | |
| 2007/0016465 A1 | 1/2007 | Schaad | |
| 2007/0055960 A1 * | 3/2007 | Damron et al. | 717/131 |
| 2007/0156486 A1 | 7/2007 | Sanabria et al. | |
| 2007/0203589 A1 | 8/2007 | Flinn et al. | |
| 2007/0276715 A1 | 11/2007 | Beringer et al. | |
| 2007/0288885 A1 * | 12/2007 | Brunel et al. | 717/104 |
| 2008/0065656 A1 | 3/2008 | Theeten et al. | |
| 2008/0091712 A1 | 4/2008 | Daherkar et al. | |
| 2008/0114627 A1 | 5/2008 | Baeuerie et al. | |
| 2008/0120129 A1 | 5/2008 | Seubert et al. | |
| 2008/0189679 A1 | 8/2008 | Rodriguez et al. | |
| 2009/0125366 A1 | 5/2009 | Chakraborty et al. | |
| 2009/0125766 A1 | 5/2009 | Safarpour et al. | |
| 2009/0164985 A1 * | 6/2009 | Balko et al. | 717/162 |
| 2009/0199293 A1 | 8/2009 | Song et al. | |
| 2009/0260021 A1 | 10/2009 | Haenel et al. | |
| 2009/0281865 A1 | 11/2009 | Stoitsev | |
| 2009/0307162 A1 | 12/2009 | Bui et al. | |
| 2009/0327105 A1 | 12/2009 | Moussa et al. | |
| 2010/0106546 A1 | 4/2010 | Sproule | |
| 2010/0153150 A1 | 6/2010 | Prigge et al. | |
| 2010/0153432 A1 | 6/2010 | Pfeifer et al. | |
| 2010/0205013 A1 | 8/2010 | Guyan et al. | |
| 2010/0235213 A1 | 9/2010 | Channabasavaiah | |
| 2010/0251242 A1 | 9/2010 | Sivasubramanian | |
| 2011/0004862 A1 | 1/2011 | Kerjriwal et al. | |
| 2011/0078606 A1 | 3/2011 | Hoff et al. | |
| 2011/0154253 A1 | 6/2011 | Lehr et al. | |
| 2012/0192143 A1 * | 7/2012 | Elaasar | G06F 8/74 717/104 |
| 2013/0139164 A1 * | 5/2013 | Balko | 718/102 |

OTHER PUBLICATIONS

Buelow, Heidi et al., "Process Modeling using BPMN 2.0 Chapter 7", Getting Started with Oracle BPM Suite 11gR1, Sep. 13, 2010, Packt Publishing Ltd., Olton, Birmingham, UK.

Oracle Business Process Management Suite, Oracle Fusion Middleware 11g, <http://www.oracle.com/us/technologies/bpm/suite/overview/index.html>, retrieved Nov. 18, 2013, 2 pages.

* cited by examiner

FLEXIBLE MICROINSTRUCTION SYSTEM FOR CONSTRUCTING MICROPROGRAMS WHICH EXECUTE TASKS, GATEWAYS, AND EVENTS OF BPMN MODELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for providing programming constructs for executing any arbitrary Business Process Model and Notation (BPMN) task, gateway and/or event.

BACKGROUND

Within large business enterprises, management of business processes is becoming a more significant issue as companies vie to improve efficiency, reduce costs, increase profits and gain more flexible and dynamic infrastructures. Business processes are a part of the day-to-day operations and services of any corporation. For example, a business process may include applying for a home loan (e.g. loan origination process), starting a mobile phone service (account initiation process), hiring a new employee (employee on-boarding process), building a new jet engine (parts and assembly process), as well as countless other processes performed by enterprises and organizations in order to accomplish specific goals.

Processes can range from very simple to highly complex and sophisticated, involving numerous decisions, tasks and activities. In this context, a business process can be thought of as a series of steps (tasks) that are executed in a particular order or path in order to achieve an objective in an organization. A business process can be visualized as a flowchart of a sequence of activities. Business processes often change over time and are useful for analyzing and optimizing the business model of a particular organization.

Business Process Model and Notation (BPMN) has been developed as a graphical representation of business processes in a business process model (formerly known as Business Process Modeling Notation). BPMN is a public standard maintained by Object Management Group, Inc. (Needham, Mass.) for business process modeling which provides a uniform graphical notation for specifying business process in a business process diagram. The primary goal of BPMN is to provide a standard notation readily understandable by all business users. BPMN supports business process management, for both technical users and business users, by providing a notation that is intuitive to business users, yet able to represent complex process semantics. The shapes, the symbols (also referred to as markers), the borders, the placement of the BPMN diagram elements, as well as their properties have well defined meanings and have to be interpreted in the same manner by all tools.

The BPMN specification maps the graphics of the notation to the underlying constructs of execution languages, for example, Business Process Execution Language (BPEL). Business Process Execution Language (BPEL) is a text-based (XML) executable language for representing business processes. It is particularly useful to define business processes that use Web Services to interact with other entities. BPEL can be used as a standard executable orchestration language to specify interactions with Web Services. The BPEL processes are represented in extensible markup language (XML) and these processes orchestrate synchronous and asynchronous services into end-to-end flows.

Even with the popularity of BPMN and other similar systems, there exists a multitude of shortcomings and other needs in this area of technology. For example, non-executable Business Process Modeling languages, such as BPMN, lack the precise semantics that are necessary to automatically validate, simulate, and execute business processes.

SUMMARY

It is desirable to provide a runtime capable of executing Business Process Modeling languages, such as BPMN in order to automatically validate, simulate, and execute business processes. Various software systems have been developed to enable business processes to be defined in a computer language that can be directly executed by a computer. These systems use automated applications in conjunction with human based tasks to deploy and execute business processes, as well as maintain, analyze and modify them over time. Using such automated software systems to directly execute processes can be more straightforward and easier to improve. The present invention provides a framework which allows a business process designed in a business process modeling language (e.g. BPMN) to be compiled into executable procedures thereby enabling automatic validation, simulation, and execution of the business processes.

A runtime capable of executing a business process requires a set of operations, derived directly from the process execution semantics. However, each BPMN task, gateway, or event defines a set of operations specific to their own semantics. Typically, a standalone program is written for each task, gateway, or event thus duplicating code required for overlapping features and/or requirements, for example receiving and sending arguments. This approach has penalties at development time due to the duplication of code. This approach also has runtime performance penalties because the compiler defines the process flow and the task or event configuration at runtime. Furthermore, adding new features and process extensions requires significant development time to write code to express the set of operations specific to the semantics of the new features and process extensions. Additionally, the implementation is limited to a specific business process modeling language.

Embodiments of the present invention define a minimal set of atomic and simple operations, called Microinstructions, which, when combined in compound programs, called Microprograms, execute any BPMN task, event or gateway. The Microinstructions framework allows a business process designed in a business process modeling language (e.g. BPMN) to be compiled into executable procedures thereby enabling automatic validation, simulation, and execution of the business processes while also facilitating code reuse and maintainability.

Selection of the set of atomic and simple operations selected for implementation as Microinstructions takes into account several factors, including but not limited to: the semantic executions, performance, re-usability, and the underlying state machine implementation. In accordance with embodiments of the invention, a set of Microinstructions define a set of primitives or instructions to execute a business process modeling language in accordance with the semantics defined by the language. The Microinstructions define atomic operations that can be executed as part of a running process. The Microinstructions thereby provide flexibility for executing business process modeling languages in any business process execution language.

Process execution semantics of the business process modeling language are formally described in terms of Microprograms. A Microprogram is a Microinstruction procedure defined using one or more Microinstructions. The Microprograms define Microinstruction procedures which map to the business processes of the business process modeling language. The business process in the business process modeling language can be compiled into Microinstruction procedures using a compiler—the Microinstruction procedures are executable on a suitable execution platform.

The Microinstructions approach provides several advantages over the previous model. The approach permits reuse of artifacts that have common semantics. The approach enhances performance because the compiler (at compile time) can statically analyze the process flow and the task or event configuration, and generate the procedures with a minimal set of Microinstructions to achieve the execution. The approach facilitates process extensions by significantly reducing the development time required to add new features and extensions into a process diagram.

In accordance with a specific embodiment, the present invention provides an implementation of the Microinstructions as part of a runtime execution of the Business Process Model and Notation 2.0 specification, and a compiler that compiles or transforms a process when it is activated to execute, into a program that runs the process using the compiled Microinstructions procedures. The compiler specifies the required procedures for each task, event or gateway, and a mechanism to build the procedure using Microinstructions. The interaction between the different compiled programs that are implemented by executing Microinstructions, defines the execution model for a specific process diagram.

Other objects and advantages of the present invention will become apparent to those skilled in the art from the following detailed description of the various embodiments, when read in light of the accompanying drawings.

DETAILED DESCRIPTION

Figure 1:
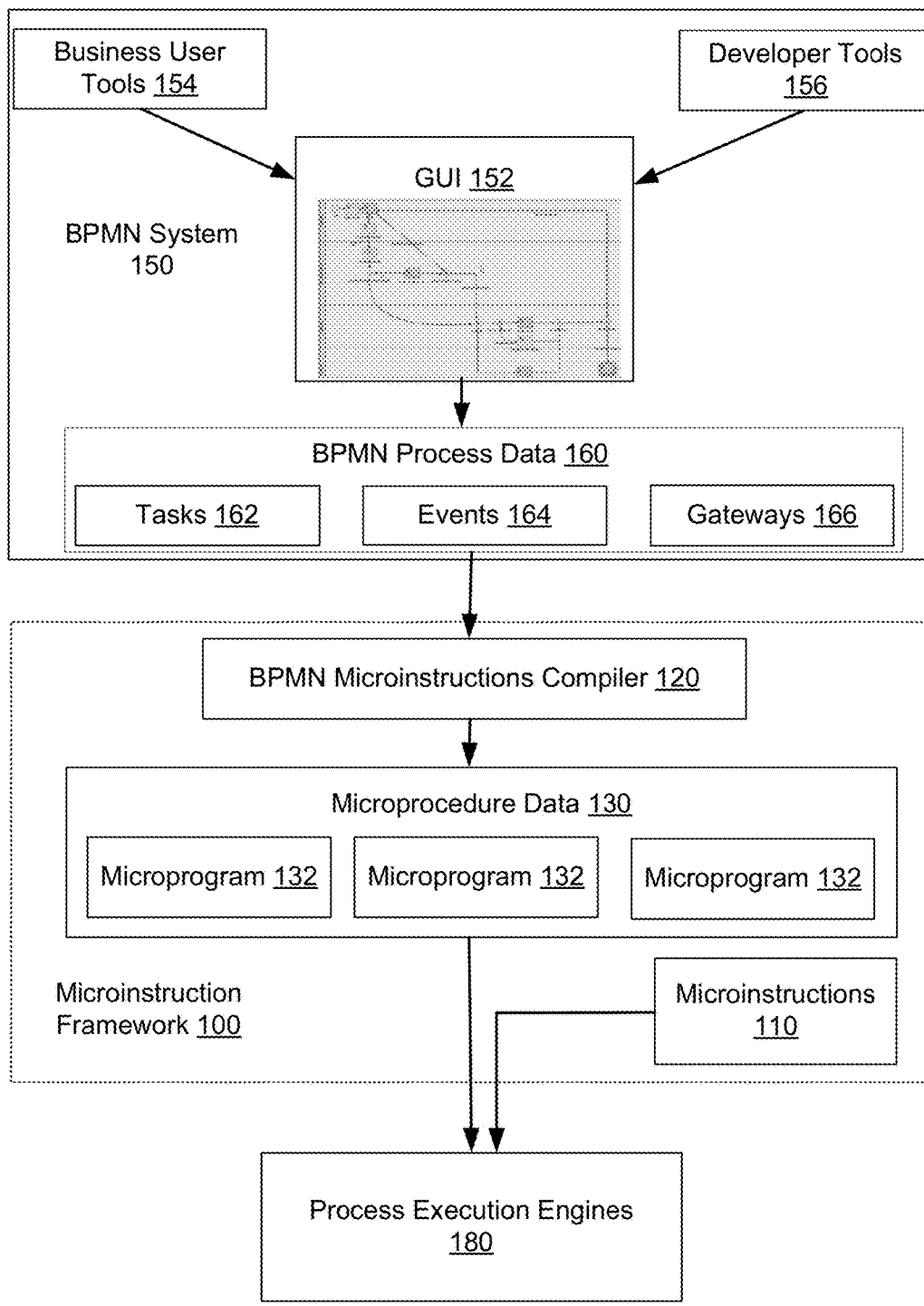
FIG. 1 shows a block diagram illustrating an overview of the system of the present invention according to an embodiment of the present invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such figure if the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Embodiments of the present invention provide a Microinstruction framework which defines a minimal set of atomic and simple operations, called Microinstructions, which, when combined into compound programs, called Microprograms, execute any BPMN task, event or gateway. The set of atomic and simple operations selected for implementation as Microinstructions takes into account several factors, including but not limited to: the semantic executions, performance, re-usability and the underlying state machine implementation. The Microinstructions define atomic operations that can be executed as part of a running process. The Microinstructions thereby provide flexibility for executing business process modeling languages in any business process execution language.

In accordance with an embodiment of the invention, the process execution semantics of the business process modeling language are formally described in terms of Microprograms. A Microprogram is a Microinstruction procedure defined by one or more Microinstructions. The Microinstructions are thereby combined into Microprograms which map to business processes of the business process modeling language, for example BPMN.

In accordance with an embodiments of the invention a compiler is provided which compiles business processes in the business process modeling language into Microinstruction procedures (Microprograms) defined by one or more Microinstructions. The business process written in e.g. BPMN is compiled into executable Microinstruction procedures. The executable Microinstruction procedures allow for validation, testing and execution of the business process on a suitable execution platform.

In accordance with a specific embodiment, the present invention provides an implementation of the Microinstructions as part of the runtime execution of BPMN 2.0, and a compiler that compiles or transforms a process when it is activated to execute, into a program that runs the process using the compiled Microinstructions procedures. The compiler specifies the required procedures for each BPMN task, event or gateway, and a mechanism to build the procedure using Microinstructions. The interaction between the different compiled programs that are implemented by executing Microinstructions, defines the execution model for a specific process diagram.

The Microinstruction framework is essentially transparent to the user who interacts with the modeling system (e.g.) BPMN and executable result. Even though the Microinstructions are not visible to the end user, the Microinstructions approach provides several advantages over the previous model. The Microinstructions approach permits reuse of operations between artifacts that have common semantics. A clear example in BPMN is Data Associations, where several tasks and events define a way of receiving and sending arguments. The Microinstructions approach enhances performance because the compiler can statically analyze the process flow and the task or event configuration, and generate the procedures with a minimal set of Microinstructions to achieve the execution. Previously process flow and task or event configuration was defined at runtime, which implies a performance penalty. The Microinstructions approach also facilitates process extensions by significantly reducing the development time required to add new features and extensions into a process diagram. Debugger, performance improvements, process execution language extensions and management can be released quicker than other products. The Microinstructions approach also provides the capability to execute other graphical or textual business modeling languages in addition to BPMN, BPEL and other business process modeling languages.

FIG. 1 shows a block diagram illustrating an overview of the system of the present invention according to an embodiment of the present invention. As shown in FIG. 1, the Microinstruction framework 100 of the present invention sits between the BPMN System 150 and the Process Execution Engines 180.

Business Process Model and Notation (BPMN) has been developed as a graphical representation of business processes in a business process model. BPMN provides a uniform graphical notation as part of GUI 152 for specifying business process in a business process diagram. The primary goal of BPMN is to provide a standard notation readily understandable by all business users. BPMN System 150 supports business process management for business users with business user tools 154 by providing a notation that is intuitive to business users, yet able to represent complex process semantics. BPMN System 150 also allows technical users to interact with the model via Developer Tools 156.

At its heart, BPMN has only three main elements, also referred to as Flow Objects—Activity (rectangle), Events (circle), and Gateways (diamond). The output of BPMN System 150 is BPMN Process Data 160 in BPMN language. The BPMN Process Data 160 comprises a plurality of Tasks 162, Events 164, and Gateways 166 descriptive of the process developed using Business Users Tools 154, Developer Tools 156 and GUI 152. An Activity represents some work done; Gateway represents a decision point or parallel forking or merge or join; Event represents either a trigger generated by the process or received by the process (from external source or from some other part of the process). The Activity can be either a Task (an atomic process step) or Embedded Sub-process (compound process step). These Flow Objects are linked by connections referred to as Sequential Flows. These Sequential Flows represent the chronological sequence of process steps. The preceding steps pass control to the following step(s) along the connection. The data is also passed along the connection flow.

The BPMN 2.0 Specification is essentially model driven rather than operational. The notation is focused modeling business processes for business users and thus, is very high level in nature. Because the notation is high level, the semantic gap between the declarative language of BPMN Process Data 160 and an infrastructure layer (Process Execution Engines 180) that can implement the business process is bigger than for other programming languages. Additionally, in BPMN 2.0 the activity semantics are highly influenced by activity configuration and context. To achieve specificness on runtime, BPMN semantics code has to be built dynamically on process compile phase. This means essentially leaving BPMN interpretation in runtime.

In embodiments of the present invention specificness capture is shifted to compile-time, by capturing activity specificness in execution logic. Using execution logic to achieve specificness and runtime performance facilitates maintainability in a long running system. This is one rationale behind the development of the Microinstruction Framework 100 which allows capturing executable semantics that can be injected in compile time and then be executed in runtime. The set of Microinstructions 110 constitute an intermediate language that decouples BPMN semantics from low level semantics to favor code reusability. Frontend decoupling allows supporting different end user languages or extensions in terms of the intermediate code (Microprograms 132), and backend decoupling allows portability to different SOA-based runtime stacks (process Execution Engines 180) by porting Microinstructions 100.

Microinstruction Framework 100 thus spans the semantic gap between the declarative language of BPMN Process Data 160 and an infrastructure layer (Process Execution Engines 180) that can implement the business process. Microinstruction Framework 100 includes a set of Microinstructions 110, and a BPMN Microinstruction Compiler 120. BPMN Microinstruction Compiler 120 is operative to compile BPMN Process Data 160 (including Tasks 162, Events 164, Gateways 166 and associated syntax) into Microprocedure Data 130 which consists of one or more Microprograms 132 written in terms of Microinstructions 110.

The Microinstructions Framework 100 mainly introduces the concept of a set of Microinstructions 110 and a BPMN Microinstructions Compiler 120 that compiles BPMN Process Data 160 into procedures (Microprograms 132) of Microinstructions 110—Microprocedure 130. The set of Microinstructions 110 defines a minimal set of atomic and simple operations, which, when combined into Microprograms 132 are capable of executing any BPMN task, event or gateway. The atomic and simple operations selected for implementation in the set of Microinstructions 110 takes into account several factors, including but not limited to: the semantic executions, performance, re-usability and the underlying state machine implementation.

The set of Microinstructions 110 define a set of primitives or instructions to execute BPMN Process Data 160 in accordance with the semantics defined by the language. The set of Microinstructions 110 define atomic operations that can be executed by Process Execution Engines 180 as part of a running process. The process execution semantics of the BPMN Process Data 160 are then formally described in terms of Microprograms 132.

Microprograms 132 are Microinstruction procedures identifying a procedure including one or more of the set of Microinstructions 110. The Microprograms 132 in combination with the Microinstructions 110 to which they refer comprise instruction sets which can be directly interpreted by Process Execution Engines 180.

Process Execution Engines 180 execute Microinstructions 110 in accordance with Microprograms 132. The interaction between the different Microprograms 132 that are implemented by execution by the Process Execution Engine 180 of the Microinstructions 110, defines the execution model for a specific process diagram as specified in BPMN Process Data 160. The runtime phase is just a sequence of Microinstructions 110 specified by the Microprograms 132, no BPMN processing occurs at runtime, all conditional code has been resolved during compiling phase such that the only conditional code is runtime state conditionals.

Runtime graph based execution model, can be defined as:
Process are described in Blocks (like structural blocks in programming languages) and Nodes (executable sentences in programming languages);
Runtime state is represented by: Scopes, block instantiations, state as variants, block structured visibility, Work Items, and activation of Nodes;
Runtime logic is specified in Node Performers associated to Nodes; and
Execution is token based.

The following is a pseudocode that demonstrate how root Microinstruction 110 procedures (in uppercase) are hooked to a Microprogrammable Node Performer and are triggered by the low level SOA infrastructure (Process Execution Engine 180).

```
executeStatements
super
try {
EXECUTE_STATEMENT
}
catch {
EXECUTE_STATEMENT_EXCEPTION
}
handleCallback
try {
HANDLE_CALLBACK
}
catch {
HANDLE_CALLBACK_EXCEPTION
}
```

Microinstructions

As described above, the set of Microinstructions 110 defines a minimal set of atomic and simple operations, which, when combined into Microprograms 132 are capable of executing any BPMN task, event or gateway. The following is a subset of the Microinstruction list that compose the intermediate language to implement these root microprocedures on compile phase.
Control Flow:
MINop: a nop instruction;
MIIfBlock: an if structure;
MISequenceBlock: a block structure; and
MICall:<program>: call program <program>.
Work Item (activity execution state) Management:
MIIsActivityCompleted: an conditional expression to check completeness of work item;
MIMarkAsComplete: changes work item state to complete; and
MICancelPerform: changes work item state to cancel.
Data Handling:
SetDataAssociationOutputVariable: sets output variable name in context, message processing logic; and
SetDataAssociationInputVariable: sets input variable name in context, message processing.
Logic:
MIInitializeMessageVariable: creates message variable;
MIProcessMessageOutputDataAssociationsForService-.SetContext: message in token metadata;
MIProcessMessageOutputDataAssociationsForService-.ProcessOutput: recover message and process data output associations (Split for the case of scope activation); and
MIProcessMessageInputDataAssociationsForService: process data input associations.
Messaging Handling:
MIEntryReceive: entry receive processing, inbound message;
MIReply: reply handler, send response message;
MIReceiveUnsubscribe: unsubscribe work item from delivery service; and
MIInvokeCallback: message callback processing.
Token Flow Control:
ToNextActivity:<source.element>-><target.element>: generate token on other node or block;
MISetExitTokenMetadata: sets result token from block activation; and
MIDecreaseThreadCount: decrease thread reference counter on block.
Exception Handling:
MIThrowException: sets work item in exception state;
MIMustCatchException: for exception trap processing;
MITrapSelectionFailure: for exception trap processing;
MIInsertInstance2Track: instance tracking info update; and
MIAuditLog(<program>): audit info update.

Microprograms

As described above, Microprograms 132 are Microinstruction procedures identifying a procedure including one or more of the set of Microinstructions 110. The Microprograms 132 in combination with the Microinstructions 110 to which they refer comprise instruction sets which can be directly interpreted by Process Execution Engines 180.

The present invention may be conveniently implemented using one or more conventional general purpose or specialized digital computer, computing device, machine, or microprocessor, and/or network of same, programmed according to the teachings of the present disclosure.

Example

Figure 2:
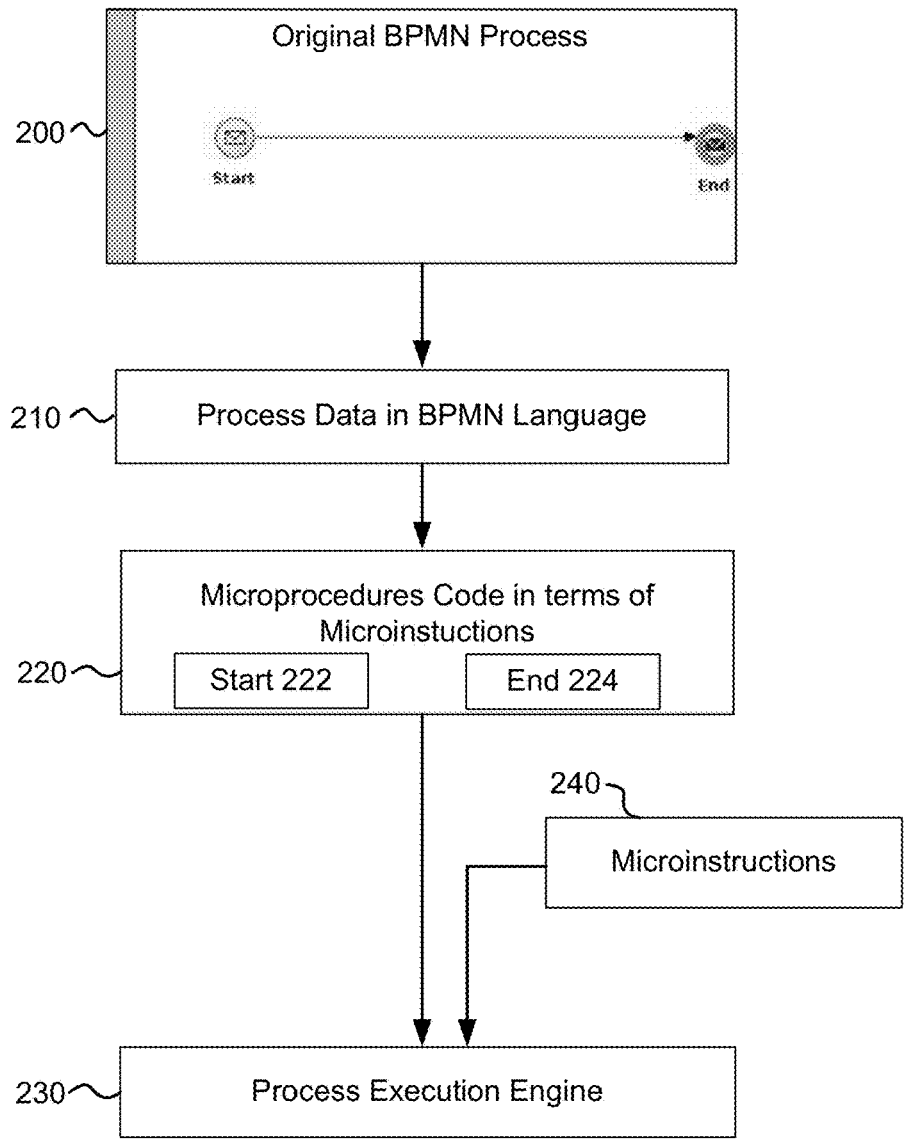
FIG. 2 shows process flow according to an embodiment of the present invention.

FIG. 2, provides a simple example of the use of Microinstructions to represent a BPMN process. As shown in FIG. 2, a business process is developed in BPMN language. The business process is specified in a business process diagram 200. BPMN provides a uniform graphical notation for specifying business process in a business process diagram. The standard notation is readily understandable by business users and allows for direct development of business processes by business users.

Business process diagram 200 illustrates a SynchProcess. Essentially it receives an input message by catching a message event and then synchronously replies back to caller by throwing a message event. A slight variation will be later introduced that shows compile output changes when response is asynchronous instead.

BPMN Microinstructions compiler input is the process data in terms of BPMN language. In this case, start catch message event. Although the business user interacts with the graphical notation, the output of BPMN system 150 (see FIG. 1) is provided in a file consisting of Process Data in BPMN Language 210. It is this file which is provided to BPMN Microinstructions Compiler 120 (see FIG. 1). The output of the compiler is Microprocedures in terms of Microinstructions 220. In the example shown in FIG. 2, the output of the compiler includes a Start Microprogram 222 and an End Microprogram 224. Start Microprogram 222 and an End Microprogram 224 are provided below to illustrate their reuse of Microinstructions. The format is first then Microprocedure name followed by the Microinstructions code. The Microprocedures code in terms of Microinstructions 220 and Microinstructions 240 are executable at runtime on process execution engine 230.

Start Microprogram 222

```
START_EVENT5749148193067[Start] (start_event)
        DEFINE_EXPIRATION_DATE
            MINop
        EXECUTE_STATEMENT
            [
                MILogIn
                MICall:PRE_EXECUTION
                MIUpdateProcInstanceAttr
                MICall:DO_EXECUTE_STATEMENT
                [
                    MIIsActivityCompleted ?
                    [
                        MICall:GENERATE_NEXT_TOKENS
                        MICall:POST_EXECUTION
                        MIUpdateProcInstanceAttr
                    ]
                ]
                [
                    MIIsActivityCompleted ?
                    -
                    :
                        MIInsertInstance2Track
                ]
            ]
        DO_EXECUTE_STATEMENT
            [
                MIInitializeMessageVariable
                MIEntryReceive(Service:SynchProcess.service;Operation:start;PortType:
{http://xmlns.oracle.com/bpmn/bpmnProcess/SynchProcess}SynchProcessPortType:InputType:
{http://xmlns.oracle.com/bpmn/bpmnProcess/SynchProcess}start;OutputType:
{http://xmlns.oracle.com/bpmn/bpmnProcess/SynchProcess}startResponse;FaultMessageType:
null;FaultCodeError:null;InputPartNamesMap:;OutputPartNamesMap:argument1-
argument1;;IncomingProperties:;OutgoingProperties:;IsEventHandlerfalse;isEventInterruptingfal
se;InputVariableName:Start_START_EVENT5749148193067_in;Correlations:;ArgumentsContai
ner:argument1-Data Declaration;;DataAssociations:argument1 -> dataObject1;;Headers:)
                MICaseManagementCallback
                SetDataAssociationOutputVariable
                MIProcessMessageOutputDataAssociationsForService.SetContext
                [
                    MIProcessMessageOutputDataAssociationsForService.ProcessOutput
                ]
                MarkAsPerformerIdempotentAndComplete
                MIInsertInstance2Track
            ]
        EXECUTE_STATEMENT_EXCEPTION
            [
                MIInsertInstance2Track
                MIAuditLog(START_EVENT5749148193067Post)
                MIThrowException
            ]
        HANDLE_CALLBACK
            [
                MIHandleCallback
                [
                    MIIsActivityCompleted ?
                    [
                        MICall:GENERATE_NEXT_TOKENS
                        MIInsertInstance2Track
                        MICall:POST_EXECUTION
                        MIUpdateProcInstanceAttr
                    ]
                ]
            ]
        DO_HANDLE_CALLBACK
            MIAssertFalse
        HANDLE_CALLBACK_EXCEPTION
            [
                MIInsertInstance2Track
                MIAuditLog(START_EVENT5749148193067Post)
                MIThrowException
            ]
        EXPIRE
            MINop
```

```
THROW_EXCEPTION
    [
        MIReceiveUnsubscribe
        MICancelPerform
    ]
CANCEL_PERFORM
    [
        MIReceiveUnsubscribe
        MICancelPerform
        [
            MIInsertInstance2Track
            MIAuditLog(START_EVENT5749148193067Post)
        ]
    ]
GENERATE_NEXT_TOKENS
    [
        [
            [
                ToNextActivity:START_EVENT5749148193067->SynchProcess_try
            ]
        ]
    ]
PRE_EXECUTION
    MIAuditLog(START_EVENT5749148193067Pre)
POST_EXECUTION
    MIAuditLog(START_EVENT5749148193067Post)
```

End Microprogram 224

```
END_EVENT5749148193140[End] (end_event)
    DEFINE_EXPIRATION_DATE
        MINop
    EXECUTE_STATEMENT
        [
            MILogIn MICall:PRE_EXECUTION
            MIUpdateProcInstanceAttr
            MICall:DO_EXECUTE_STATEMENT
            [
                MIIsActivityCompleted ?
                [
                    MICall:GENERATE_NEXT_TOKENS
                    MICall:POST_EXECUTION
                    MIUpdateProcInstanceAttr
                ]
            ]
            MIInsertInstance2Track
        ]
    DO_EXECUTE_STATEMENT
        [
            MIInitializeMessageVariable
            SetDataAssociationInputVariable
            MIProcessMessageInputDataAssociationsForService
            MIReply(Service:SynchProcess.service;Operation:start;PortType:{http://xmlns.oracle.
            com/bpmn/bpmnProcess/SynchProcess}SynchProcessPortType;InputType:{http://xmlns.
            oracle.com/bpmn/bpmnProcess/SynchProcess}start;OutputType:{http://xmlns.oracle.com
            /bpmn/bpmnProcess/SynchProcess}startResponse;FaultMessageType:null;FaultCodeErr
            or:null;InputPartNamesMap:;OutputPartNamesMap:;IncomingProperties:;OutgoingProper
            ties:;OutputVariableName:End_END_EVENT5749148193140_in;Correlations:;Argument
            sContainer:;DataAssociations:;Headers:)
            MarkAsPerformerIdempotentAndComplete
        ]
    EXECUTE_STATEMENT_EXCEPTION
        [
            MIMustCatchException ?
            [
                MIInsertInstance2Track
                MIAuditLog(END_EVENT5749148193140Post)
                MITrapSelectionFailure
            ]
            :
            [
                [
                    MIInsertInstance2Track
                    MIAuditLog(END_EVENT5749148193140Post)
                    MIThrowException
                ]
```

```
        ]
    ]
HANDLE_CALLBACK
    [
        MIHandleCallback
        [
            MIIsActivityCompleted ?
            [
                MICall:GENERATE_NEXT_TOKENS
                MIInsertInstance2Track
                MICall:POST_EXECUTION
                MIUpdateProcInstanceAttr
            ]
        ]
    ]
DO_HANDLE_CALLBACK
    MINop
HANDLE_CALLBACK_EXCEPTION
    [
        MIMustCatchException ?
        [
            MIInsertInstance2Track
            MIAuditLog(END_EVENT5749148193140Post)
            MITrapSelectionFailure
        ]
        :
        [
            [
                MIInsertInstance2Track
                MIAuditLog(END_EVENT5749148193140Post)
                MIThrowException
            ]
        ]
    ]
EXPIRE
    MINop
THROW_EXCEPTION
    MINop
CANCEL_PERFORM
    [
        MIInsertInstance2Track
        MIAuditLog(END_EVENT5749148193140Post)
    ]
GENERATE_NEXT_TOKENS
    [
        MISetExitTokenMetadata
        MIDecreaseThreadCount
    ]
PRE_EXECUTION
    MIAuditLog(END_EVENT5749148193140Pre)
POST_EXECUTION
    MIAuditLog(END_EVENT5749148193140Post)
END_EVENT5749148193140POST_AUDIT_CANCEL
    MIAuditLog(END_EVENT5749148193140Post)
END_EVENT5749148193140POST_AUDIT_EXCEPTION
    MIAuditLog(END_EVENT5749148193140Post)
```

Comparing the microprocedure code for the Start Microprogram 222 and End Microprogram 224 it can be observed that they essentially share the same Microinstructions code. Essentially the only difference is that the DO_EXECUTE_STATEMENT microprocedure, that is basically the activity differential semantic (start process inbound message, end replies back), and the processing of sequence flows in the GENERATE_NEXT_TOKENS (start process start the flow and end finishes it). Thus, the use of the Microinstructions framework facilitates widespread reuse of the code. Reusability of code in this manner facilitates management of code complexity and code maintenance.

Runtime

The following output shows the execution log in runtime phase for a given instance. Data is presented as:

[<bpmn thread of execution, microprocedure being executed>] <Microinstruction being executed> <Microinstruction actual parameters>.

It should be noted that the runtime phase is just a sequence of Microinstructions. No BPMN processing is conducted at runtime. All conditional code has been resolved on compile phase. The only conditional code would be runtime state conditionals. Thus, there is no additional execution overhead as a result of the use of the Microinstructions framework.

```
START_EVENT5749148193067[Start]
    (start_event)
    [-1,DEFINE_EXPIRATION_DATE] MINop
```

```
    [0,EXECUTE_STATEMENT] MILogIn
    [0,EXECUTE_STATEMENT] MICall:PRE_EXECUTION
    [0,EXECUTE_STATEMENT] MIAuditLog(START_EVENT5749148193067Pre)
    [0,EXECUTE_STATEMENT] MIUpdateProcInstanceAttr
    [0,EXECUTE_STATEMENT] MICall:DO_EXECUTE_STATEMENT
    [0,EXECUTE_STATEMENT] MIInitializeMessageVariable
    [0,EXECUTE_STATEMENT]
MIEntryReceive(Service:SynchProcess.service;Operation:start;PortType:{http://xmlns.oracle.co
m/bpmn/bpmnProcess/SynchProcess}SynchProcessPortType;InputType:{http://xmlns.oracle.co
m/bpmn/bpmnProcess/SynchProcess}start;OutputType:{http://xmlns.oracle.com/bpmn/bpmnPro
cess/SynchProcess}startResponse;FaultMessageType:null;FaultCodeError:null;InputPartName
sMap:;OutputPartNamesMap:argument1-
argument1;;IncomingProperties:;OutgoingProperties:;IsEventHandlerfalse;isEventInterruptingfal
se;InputVariableName:Start_START_EVENT5749148193067_in;Correlations:;ArgumentsContai
ner:argument1-Data_Declaration:;;DataAssociations:argument1_->_dataObject1;;Headers:)
    [0,EXECUTE_STATEMENT] MICaseManagementCallback
    [0,EXECUTE_STATEMENT] SetDataAssociationOutputVariable
    [0,EXECUTE_STATEMENT]
MIProcessMessageOutputDataAssociationsForService.SetContext
    [0,EXECUTE_STATEMENT]
    MIProcessMessageOutputDataAssociationsForService.ProcessOutput
    [0,EXECUTE_STATEMENT] MarkAsPerformerIdempotentAndComplete
    [0,EXECUTE_STATEMENT] MIInsertInstance2Track
    [0,EXECUTE_STATEMENT] MIIsActivityCompleted(true)
    [0,EXECUTE_STATEMENT] MICall:GENERATE_NEXT_TOKENS
    [0,EXECUTE_STATEMENT] ToNextActivity:START_EVENT5749148193067-
>SynchProcess_try
    [0,EXECUTE_STATEMENT] MICall:POST_EXECUTION
    [0,EXECUTE_STATEMENT] MIAuditLog(START_EVENT5749148193067Post)
    [0,EXECUTE_STATEMENT] MIUpdateProcInstanceAttr
    [0,EXECUTE_STATEMENT] MIIsActivityCompleted(true)
```

The above illustrates a novel conceptual framework model, based on the idea of "Microprogramming" for the design of a BPMN runtime stack. As shown above, the Microinstructions framework has proved being useful on achieving results on reusability of code maximization, and consistent performance, by ensuring specificness on execution. The use of the Microinstructions framework facilitates widespread reuse of the code. Reusability of code in this manner facilitates management of code complexity and code maintenance without additional execution overhead.

Figure 3:
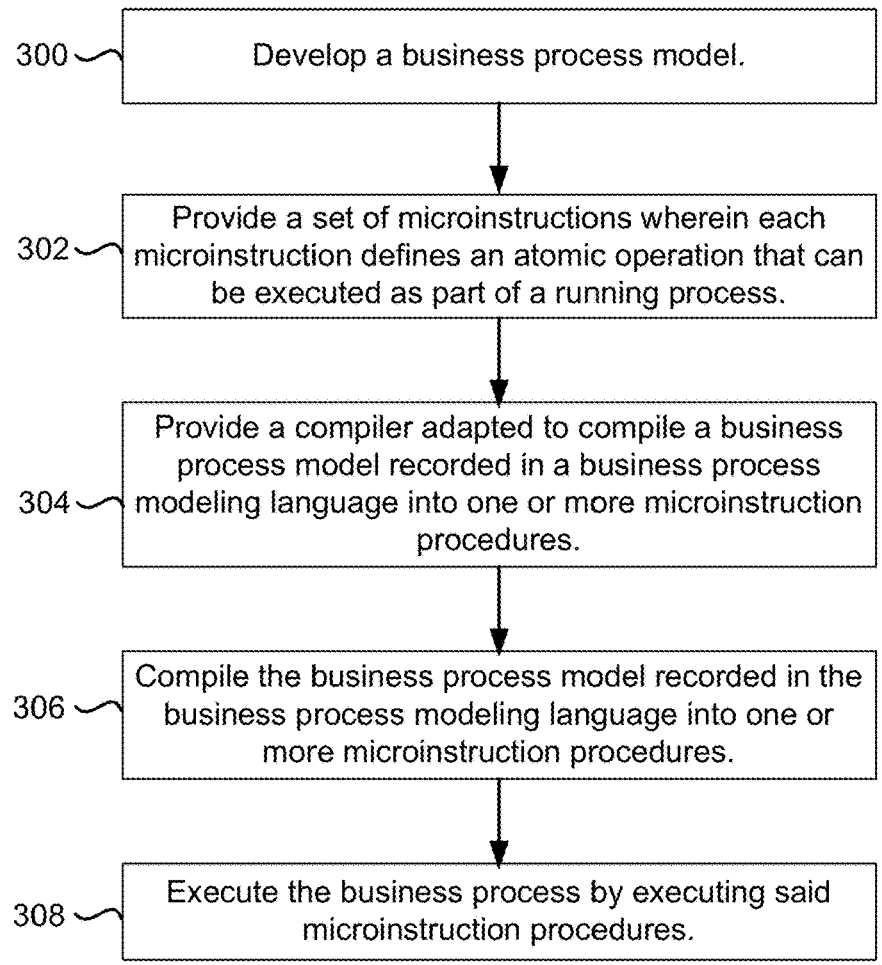
FIG. 3 shows a method for implementing BPMN models in Microinstructions according to an embodiment of the present invention.

FIG. 3 shows a method for implementing BPMN models in Microinstructions according to an embodiment of the present invention. Initially, at step 300, a business process model is developed using a business process modeling language. For example, a business process model can be developed using the GUI of a BPMN system by interaction of business users to define the business process and developers to define IT infrastructure supporting the business process. The output of the development is a business process model in a business process modeling language (for example BPMN language).

At step 302 a set of Microinstructions is provided. The Microinstructions define atomic operations that can be executed as part of a running process. At step 304, a compiler is provided. The compiler is adapted to compile the business process model represented in the business process modeling language (for example BPMN) into one or more procedures of Microinstructions. A business process model may be represented by one or more procedures of Microinstructions which may be referred to as Microprograms. At step 306, the compiler is used to compile the business process model as represented in the business process modeling language (for example BPMN language) into one or more Microinstruction procedures. At step 308, the business process is executed by executing the Microinstruction procedures. It should be noted that the runtime phase is just a sequence of Microinstructions without BPMN processing. All conditional code has been resolved during compilation, the only conditional code would be runtime state conditionals.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for executing a business process from a business process model recorded in a non-executable business process modeling language, the method comprising:
   providing a set of microinstructions wherein each microinstruction defines an atomic operation that can be executed as part of a running business process in accordance with semantics defined by the non-executable business process modeling language;
   compiling, via a compiler operating on one or more microprocessors, a business process model for a business process recorded in the non-executable business process modeling language into a compiled business process model comprising a plurality of microprograms,
   wherein each microprogram comprises a minimal set of microinstructions selected from the set of microinstructions that together execute at least one of an activity, an event or a gateway of the business process model,
   wherein the microinstructions constitute an intermediate code portable to different runtime environments,
   wherein the compiler is configured to
      statically analyze the business process model to determine a process flow of the business process model representing a sequence of process steps and configurations for activities, events and gateways of the business process model that comprise the process steps,
      select, subsequent to and based on statically analyzing the business process model, the minimal set of microinstructions for each of the plurality of microprograms, and
      generate the plurality of microprograms using the selected microinstructions to achieve execution of the business process model,
   wherein the microinstructions that comprise the minimal set of microinstructions are selected for each microprogram according to semantic execution of that microprogram within the process flow, and according to
      target runtime performance of the business process,
      ability to reuse a microinstruction in other microprograms within the compiled business process model, and
      compliance with the underlying state machine implementation, and
   wherein said compiling resolves conditional code in said business process model recorded in said non-executable business process modeling language, and
   wherein at runtime said compiled business process model is executable on an execution platform.

2. The method of claim 1, wherein the business process modeling language is Business Process Model and Notation language.

3. The method of claim 1, further comprising:
   executing said plurality of microprograms on the execution platform.

4. The method of claim 1, further comprising:
   simulating said business process using said plurality of microprograms.

5. The method of claim 1, further comprising:
   testing said business process using said plurality of microprograms.

6. The method of claim 1, further comprising:
   executing said plurality of microprograms on the execution platform; and
   testing said business process using said plurality of microprograms.

7. The method of claim 1, further comprising:
   developing the business process model using a graphic user interface of a business process modeling language.

8. A non-transitory computer readable storage medium including instructions stored thereon for supporting execution of a business process from a business process model recorded in a non-executable business process modeling language, which instructions, when executed by a computer, cause the computer to perform steps comprising:
   providing a set of microinstructions wherein each microinstruction defines an atomic operation that can be executed as part of a running business process in accordance with semantics defined by the non-executable business process modeling language;
   compiling, via a compiler operating on one or more microprocessors, a business process model for a business process recorded in the non-executable business process modeling language into a compiled business process model comprising a plurality of microprograms,
   wherein each microprogram comprises a minimal set of microinstructions selected from the set of microinstructions that together execute at least one of an activity, an event or a gateway of the business process model,
   wherein the microinstructions constitute an intermediate code portable to different runtime environments,
   wherein the compiler is configured to
      statically analyze the business process model to determine a process flow of the business process model representing a sequence of process steps and configurations for activities, events and gateways of the business process model that comprise the process steps,
      select, subsequent to and based on statically analyzing the business process model, the minimal set of microinstructions for each of the plurality of microprograms, and
      generate the plurality of microprograms using the selected microinstructions to achieve execution of the business process model,
   wherein the microinstructions that comprise the minimal set of microinstructions are selected for each microprogram according to semantic execution of that microprogram within the process flow, and according to
      target runtime performance of the business process,
      ability to reuse a microinstruction in other microprograms within the compiled business process model, and
      compliance with the underlying state machine implementation, and
   wherein said compiling resolves conditional code in said business process model recorded in said non-executable business process modeling language, and
   wherein at runtime said compiled business process model is executable on an execution platform.

9. The non-transitory computer readable storage medium of claim 8, wherein the business process modeling language is Business Process Model and Notation language.

10. The non-transitory computer readable storage medium of claim 8, including instructions stored thereon which, when executed by a computer, cause the computer to perform further steps comprising:
executing said plurality of microprograms on the execution platform.

11. The non-transitory computer readable storage medium of claim 8, including instructions stored thereon which, when executed by a computer, cause the computer to perform further steps comprising:
simulating said business process using said plurality of microprograms.

12. The non-transitory computer readable storage medium of claim 8, including instructions stored thereon which, when executed by a computer, cause the computer to perform further steps comprising:
testing said business process using said plurality of microprograms.

13. The non-transitory computer readable storage medium of claim 8, including instructions stored thereon which, when executed by a computer, cause the computer to perform further steps comprising:
executing said plurality of microprograms on the execution platform; and
testing said business process using said plurality of microprograms.

14. The non-transitory computer readable storage medium of claim 8, including instructions stored thereon which, when executed by a computer, cause the computer to perform further steps comprising:
developing the business process model using a graphic user interface of a business process modeling language.

15. A system for executing a business process from a business process model recorded in a non-executable business process modeling language, the system comprising:
one or more microprocessors and a memory;
a set of microinstructions wherein each microinstruction defines an atomic operation that can be executed as part of a running business process in accordance with semantics defined by the non-executable business process modeling language;
a compiler operating on said one or more microprocessors and memory; and
wherein the compiler is adapted to compile a business process model for a business process recorded in the non-executable business process modeling language into a compiled business process model comprising a plurality of microprograms,
wherein each microprogram comprises a minimal set of microinstructions selected from the set of microinstructions that together execute at least one of an activity, an event or a gateway of the business process model,
wherein the microinstructions constitute an intermediate code portable to different runtime environments,
wherein the compiler is configured to
statically analyze the business process model to determine a process flow of the business process model representing a sequence of process steps and configurations for activities, events and gateways of the business process model that comprise the process steps,
select, subsequent to and based on statically analyzing the business process model, the minimal set of microinstructions for each of the plurality of microprograms, and
generate the plurality of microprograms using the selected microinstructions to achieve execution of the business process model,
wherein the microinstructions that comprise the minimal set of microinstructions are selected for each microprogram according to semantic execution of that microprogram within the process flow, and according to
target runtime performance of the business process,
ability to reuse a microinstruction in other microprograms within the compiled business process model, and
compliance with the underlying state machine implementation, and
wherein said compiling resolves conditional code in said business process model recorded in said non-executable business process modeling language, and
wherein at runtime said compiled business process model is executable on an execution platform.

16. The system of claim 15, further comprising:
a process development system including a graphical user interface for designing the business process model and recording the business process model in the business process modeling language.

17. The system of claim 15, further comprising:
a process development system including a graphical user interface for designing the business process model and recording the business process model in the business process modeling language wherein the business process modeling language is Business Process Model and Notation language.

18. The system of claim 15, further comprising:
an execution platform for executing said plurality of microprograms to thereby execute the business process.

19. The system of claim 15, further comprising:
an execution platform for executing said plurality of microprograms to thereby simulate the business process.

20. The system of claim 15, further comprising:
an execution platform for executing said plurality of microprograms to thereby test the business process.

* * * * *

UNITED STATES PATENT AND TRADEMARK OFFICE
CERTIFICATE OF CORRECTION

| | |
|---|---|
| PATENT NO. | : 10,037,197 B2 |
| APPLICATION NO. | : 13/834595 |
| DATED | : July 31, 2018 |
| INVENTOR(S) | : Barletta et al. |

It is certified that error appears in the above-identified patent and that said Letters Patent is hereby corrected as shown below:

In the Drawings

On sheet 2 of 3, in Figure 2, under Reference Numeral 220, Line 2, delete "Microinstuctions" and insert -- Microinstructions --, therefor.

Signed and Sealed this
Fourteenth Day of May, 2019

Andrei Iancu
*Director of the United States Patent and Trademark Office*